(12) United States Patent
Edsall et al.

(10) Patent No.: US 9,641,409 B2
(45) Date of Patent: *May 2, 2017

(54) TIMESTAMPING PACKETS IN A NETWORK

(71) Applicant: Cisco Technology, Inc., San Jose, CA (US)

(72) Inventors: Thomas J. Edsall, Los Gatos, CA (US); Wei-Jen Huang, Burlingame, CA (US); Chih-Tsung Huang, Burlingame, CA (US); Yichou Lin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/701,882

(22) Filed: May 1, 2015

(65) Prior Publication Data

US 2015/0236933 A1      Aug. 20, 2015

Related U.S. Application Data

(63) Continuation of application No. 13/708,347, filed on Dec. 7, 2012, now Pat. No. 9,054,967.

(Continued)

(51) Int. Cl.
| | |
|---|---|
| *H04J 3/14* | (2006.01) |
| *H04J 3/24* | (2006.01) |
| *H04L 12/28* | (2006.01) |
| *H04B 7/212* | (2006.01) |
| *G06F 15/16* | (2006.01) |
| *H04L 12/26* | (2006.01) |
| *H04L 29/08* | (2006.01) |

(52) U.S. Cl.
CPC ........ *H04L 43/0852* (2013.01); *H04L 43/106* (2013.01); *H04L 69/321* (2013.01)

(58) Field of Classification Search
CPC . H04L 43/0852; H04L 43/106; H04L 69/321; H04L 69/16
See application file for complete search history.

(56) References Cited

U.S. PATENT DOCUMENTS

| | | |
|---|---|---|
| 6,246,684 B1 | 6/2001 | Chapman et al. |
| 6,892,237 B1 | 5/2005 | Gai et al. |

(Continued)

*Primary Examiner* — Kiet Tang
(74) *Attorney, Agent, or Firm* — Edell, Shapiro & Finnan, LLC

(57) ABSTRACT

Techniques are presented herein to facilitate latency measurements in a networking environment. A first network device receives a packet for transport within a network domain that comprises a plurality of network devices. The plurality of network devices have a common time reference, that is, they are time synchronized. The first network device generates timestamp information indicating time of arrival of the packet at the first network device. The first network device inserts into the packet a tag that comprises at least a first subfield and a second subfield. The first subfield comprising a type indicator to signify to other network devices in the network domain that the tag includes timestamp information, and the second subfield includes the timestamp information. The first network device sends the packet from to into the network domain to another network device. Other network devices which receive that packet can make latency measurements.

24 Claims, 6 Drawing Sheets

Related U.S. Application Data

(60) Provisional application No. 61/702,323, filed on Sep. 18, 2012.

(56) References Cited

U.S. PATENT DOCUMENTS

| | | |
|---|---|---|
| 6,990,202 B2 | 1/2006 | Wee et al. |
| 7,106,731 B1 | 9/2006 | Lin et al. |
| 7,395,332 B2 | 7/2008 | Gai et al. |
| 7,474,666 B2 | 1/2009 | Kloth et al. |
| 7,656,818 B1 | 2/2010 | Baroudi et al. |
| 7,830,793 B2 | 11/2010 | Gai et al. |
| 7,899,048 B1 | 3/2011 | Walker et al. |
| 7,961,621 B2 | 6/2011 | Bergamasco et al. |
| 7,969,971 B2 | 6/2011 | Gai et al. |
| 8,208,389 B2 | 6/2012 | Alaria et al. |
| 8,640,036 B2 | 1/2014 | Pignataro et al. |
| 2003/0231596 A1 | 12/2003 | Hong |
| 2006/0007939 A1* | 1/2006 | Elangovan ............ H04L 12/465 370/395.53 |
| 2006/0062209 A1 | 3/2006 | Riley |
| 2006/0253900 A1 | 11/2006 | Paddon et al. |
| 2006/0268847 A1 | 11/2006 | Halbraich et al. |
| 2008/0013475 A1* | 1/2008 | Bandou ................... G05B 9/02 370/324 |
| 2008/0159260 A1* | 7/2008 | Vobbilisetty ............ H04L 69/08 370/351 |
| 2009/0034416 A1 | 2/2009 | Baron et al. |
| 2009/0041011 A1 | 2/2009 | Sheppard |
| 2009/0100040 A1 | 4/2009 | Sheppard et al. |
| 2009/0171474 A1 | 7/2009 | Birze et al. |
| 2010/0054152 A1 | 3/2010 | Foschiano et al. |
| 2010/0154033 A1 | 6/2010 | Oulai |
| 2011/0149998 A1* | 6/2011 | Thompson ............ H04J 3/0697 370/474 |
| 2013/0036239 A1* | 2/2013 | Spencer ................. H04L 69/16 709/248 |

* cited by examiner

TIMESTAMPING PACKETS IN A NETWORK

RELATED APPLICATIONS

This application is a continuation of U.S. application Ser. No. 13/708,347, filed Dec. 7, 2012, entitled "Timestamping Packets in a Network," which claims priority to U.S. Provisional Patent Application No. 61/702,323, filed Sep. 18, 2012, also entitled "Timestamping Packets in a Network." Both applications are incorporated herein by reference in their entirety.

TECHNICAL FIELD

The present disclosure relates to networking systems and devices.

BACKGROUND

In a computer network, such as a data center, data is transmitted from a source to a destination in the form of packets that generally pass through one or more networking devices (e.g., switches, routers, firewalls, etc.). During the transmission, packets are generally temporarily stored in one or more network buffers of the networking devices.

Certain data center customers demand network architectures that can provide low latency, high bandwidth, and often massive scalability. However, measuring latency may be difficult and time sensitive applications often do not have the proper visibility into how it has taken for packets to reach a certain destination and when packets were actually sourced at specific locations in the network.

DESCRIPTION OF EXAMPLE EMBODIMENTS

Overview

Techniques are presented herein to facilitate latency measurements in a networking environment. A first network device receives a packet for transport within a network domain that comprises a plurality of network devices. The plurality of network devices have a common time reference, that is, they are time synchronized. The first network device generates timestamp information indicating time of arrival of the packet at the first network device. The first network device inserts into the packet a tag that comprises at least a first subfield and a second subfield. The first subfield comprises a type indicator to signify to other network devices in the network domain that the tag includes timestamp information, and the second subfield includes the timestamp information. The first network device sends the packet into the network domain to another network device. Other network devices in the network domain which receive that packet can then make latency measurements, insert another tag, overwrite the tag, and perform various other operations described herein.

Example Embodiments

Figure 1:
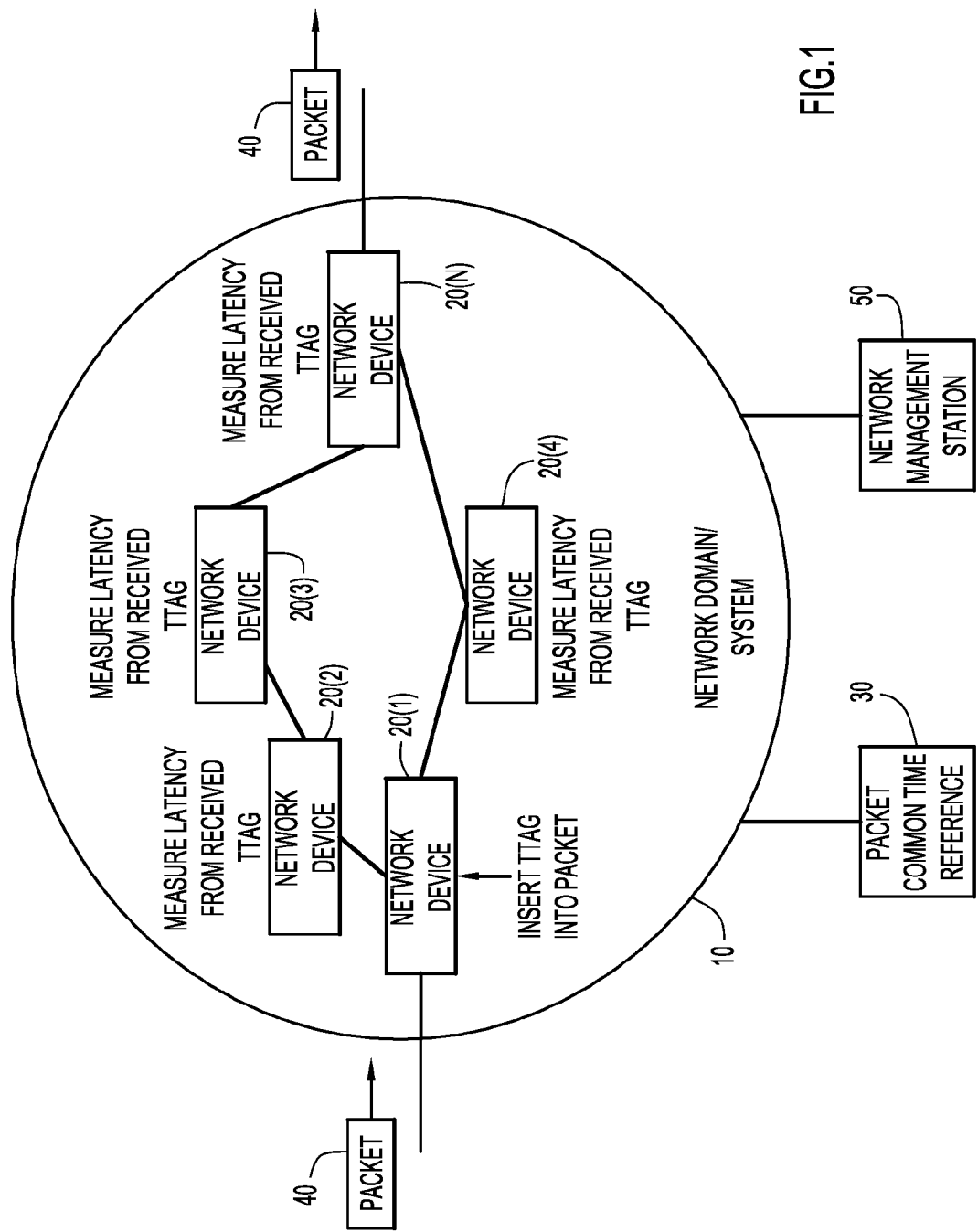
FIG. 1 illustrates an example network block diagram in which the timestamping of packets is used to track latency at different points in a network domain.

Reference is first made to FIG. 1. FIG. 1 shows a network domain or system 10 comprising a plurality of network devices 20(1)-20(N) that are all synchronized to a common time reference 30. That is, all of the network devices 20(1)-20(N) of interest in the network domain 10 have the same global time reference, determined by IEEE 1588 Precision Time Protocol (PTP) or other methods now known or hereinafter developed. For simplicity, the term "node" is also used herein synonymously with the term "network device".

A packet 40 enters the network domain 10 at some edge node, e.g., network device 20(1) in the example of FIG. 1, and departs the network domain 10 at another edge node, e.g., network device 20(N). Presented herein are techniques to determine latency at any point in the network domain for a packet as it traverses through the network domain 10. One particular latency measure that is of interest is the end-to-end latency, that is, the elapsed time (latency) for a packet to travel between an ingress port of edge network device 20(1) to an egress port of edge network device 20(N) of network domain 10.

A timestamp tag (TTAG) is inserted into a packet 40 by the edge network device 20(1) of the network domain 10. The TTAG includes timestamp information indicating time of arrival at network device 20(1). All of the network devices in the network domain 10 that receive the packet 40 (with the inserted TTAG) can perform measurements based on the timestamp information contained in TTAG inserted into packet 40, and perform other operations, including adding another TTAG, overwriting an existing TTAG, adding another timestamp value into an existing TTAG, etc., as will described in more detail hereinafter. As indicated in FIG. 1, any network device in the network domain 10 can measure and report the latency based on the TTAG contained in a packet. However, not all network devices must understand a TTAG. In cases in which a network device does not understand a TTAG contained in a packet, the TTAG can be skipped as part of packet processing or in the case of Ethernet packets, some switches will process the packet up to the TTAG and skip the rest of the packet.

The network devices 20(1)-20(N) shown in FIG. 1 can be any network device now known or hereinafter developed, including a switch, router, gateway, a software stack on a host device, virtual network interface cards (VNICs) virtual switches, physical network interface cards (including those that support virtualization).

FIG. 1 further shows a network management station 50 that may take a variety of forms, e.g., server computer, virtualized server, etc., that communicates with each network device 20(1)-20(N) for purposes of configuring the network devices to insert TTAGs, make latency measurements, report latency measurements, and to receive latency measurements from the network devices 20(1)-20(N).

Figure 2:
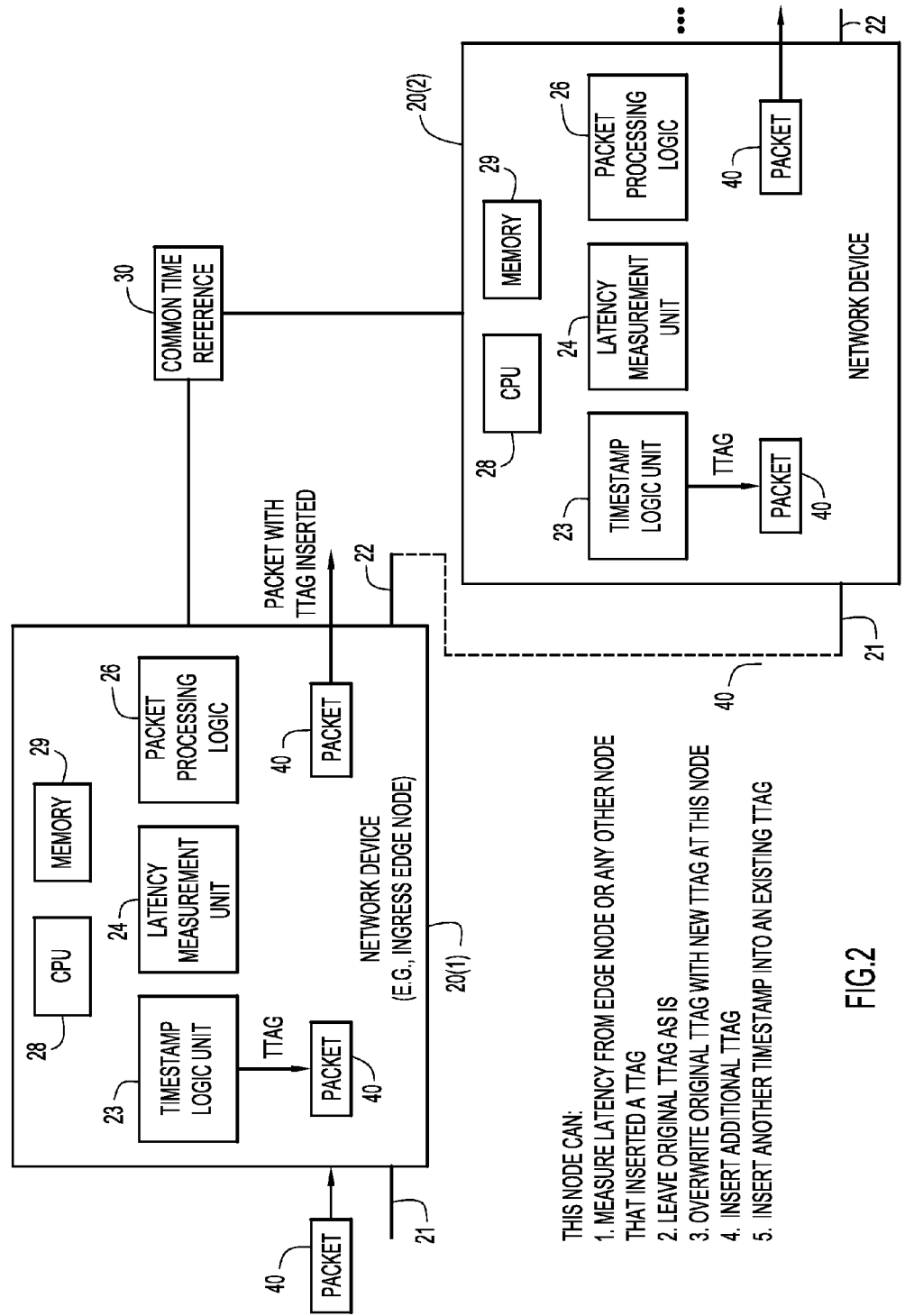
FIG. 2 illustrates in more detail components in each network device in the network domain that enable the timestamping and latency measurements of packets that traverse the network domain.

Turning now to FIG. 2, a more detailed description is provided for the components of a network device that are configured to perform the TTAG insertion and latency measurement operations presented herein. FIG. 2 shows a simplified diagram of two network devices 20(1) and 20(2), though it should be understood that each network device 20(1)-20(N) in a network domain that is to participate in the techniques presented herein is configured in a similar manner as that shown for network devices 20(1) and 20(2) in FIG. 2. Specifically, each network device 20(1)-20(N) includes multiple ports, and for simplicity an ingress port 21 and egress 22 are shown in FIG. 2. Furthermore, each network device includes a timestamp logic unit 23, a latency measurement unit 24, packet processing logic 26, a central processing unit (CPU) 28 and memory 29. The packet processing logic 26 is representative of the conventional packet processing components in a network device, such as buffers, switch tables, switch fabric, queues, etc., that operate to determine whether to drop, forward (and via a particular egress port), switch, etc., a particular packet based on the contents of the header of the packet. The details of the packet processing logic 26 are not described herein because they are well known in the art, and do not pertain to the timestamping techniques presented herein.

The timestamp logic unit 23 generates a timestamp upon arrival of the packet at an ingress port 21 of the network device. The timestamp is with respect to the common time reference 30 used by all network devices in the network domain. The timestamp logic unit 23 may insert the TTAG into a packet 40 immediately upon arrival at the ingress port, and then forward the packet to be processed by the packet processing logic 26, insert the TTAG in parallel with the processing of the packet by the packet processing logic 26, or after processing of the packet by the packet processing logic 26. Examples of various formats of a TTAG are presented hereinafter in connection with FIGS. 3A-3D. The TTAG is inserted in any manner that does not interfere with the normal processing of the packet by the network devices.

The timestamp logic unit 23 may also be configured to insert additional information into a TTAG, including one or more bits to indicate a validity of the timestamp value, one or more bits to indicate a timing precision of the timestamp value. In general, precision is system or network domain wide and is pre-negotiated among the network devices with respect to the common time reference 30. When a new timestamp value is to be inserted into a packet, a network device uses either ingress port timestamp from the common time reference 30 (synchronized clock) or an invalid value of zero. Invalid values are preserved across the network domain, as described further hereinafter.

Since any device can serve as an edge node in a network domain, each network device includes latency measurement 24 which is configured to perform a latency computation (current time minus the timestamp value contained in a TTAG of a received packet). For example, the latency measurement unit 24 in network device 20(2) may compute the latency associated with packet 40 using the timestamp value contained in the TTAG inserted by edge network device 20(1).

The CPU 28 may perform higher level latency analysis and reporting operations based on software instructions contained in memory 29. The memory 29 may also serve for additional storage of latency measurements. The CPU 28 may send latency measurements to a local or remotely located computing device that is used by a network administrator to monitor performance of network domain 20. Moreover, the CPU 28 in any given network device may receive commands or instructions from a network management station (FIG. 1) to control the TTAG-related operations in a network device, latency measurements made by a network device, etc.

Memory 29 may comprise read only memory (ROM), random access memory (RAM), magnetic disk storage media devices, optical storage media devices, flash memory devices, electrical, optical, or other physical/tangible memory storage devices. The CPU is, for example, a microprocessor or microcontroller. Thus, in general, the memory 29 may comprise one or more tangible (non-transitory) computer readable storage media (e.g., a memory device) encoded with software comprising computer executable instructions and when the software is executed (by the CPU 28) it is operable to perform the operations described herein.

The timestamp logic unit 23 and latency measurement unit 24 may be embodied by digital logic gates configured to perform the operations described herein, or in another form, by software stored in memory 29 and executed by CPU 28 to perform the operations described herein. In another example, the timestamp logic unit 23 and latency measurement unit 24 may be integrated or embedded with the packet processing logic 26, which itself may be embodied by one or more application specific integrated circuits (ASICs).

As shown in FIG. 2, when a network device receives from another network device a packet that includes a TTAG, there are several options for operations that may be performed. First, the network device can measure latency from the edge node or any other node that inserted a TTAG in the packet. Second, the network device can do nothing, leave the TTAG as is and process the packet in the ordinary course. Third, the network device can overwrite an existing TTAG in the packet with a new TTAG (and timestamp of arrival) at this network device. Fourth, the network device can insert an additional TTAG into the packet. For example, multiple TTAGs can be inserted such as through tunnels or if negotiated across ports. Fifth, the network device can insert an additional timestamp value (based on time of arrival at this network device) into an existing TTAG of the packet. The CPU 28 in one or more network devices may be configured, through software stored in memory 29, to insert additional TTAGs into a packet, overwrite an existing TTAG or insert another timestamp value in a TTAG as described further hereinafter. In any case, the network device processes the packet as it normally would if the TTAG were not present. As shown in FIG. 2, network device 20(2) sends packet 40 on in the network domain with any existing TTAGs, a newly overwritten TTAG, etc., under control of the CPU 28.

Figure 3A:
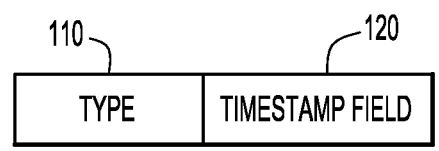
FIGS. 3A-3E illustrate examples of a timestamp tag (TTAG) that may be inserted into a packet by any of the network devices in the network domain, and which is used for latency measurements.

Reference is now made to FIGS. 3A-3E for examples of various formats of TTAGs. FIG. 3A illustrates a first basic form of a TTAG 100, including a first Type subfield 110 and a second Timestamp subfield 120. The Type subfield 110 is used to identify the "type" as a TTAG which allows any network device to recognize the TTAG. The independence of timestamp information contained in a TTAG from any other existing format liberates current network devices or CPUs to determine system-wide time. In one example, the Type subfield 110 is 8 bytes such as that specified by an Ethertype subfield in an Ethernet frame. The Timestamp subfield 120 is a 48 bit number having a format of an unsigned rolling 48 bit binary number value, e.g., having 100 picosecond resolution. When clock time increments to zeros for all 48 LSBs, the Timestamp subfield uses a value of one instead. A value of one repeats unlike one's complement. Thus, a lower 48 bit clock time of 0 and 1 both map to Timestamp subfield value of 1.

Figure 3B:
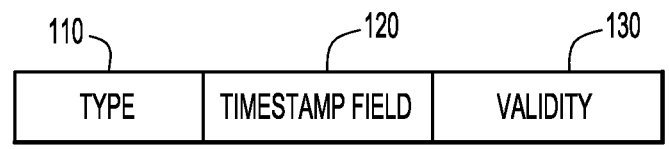

FIG. 3B shows an example format of a TTAG 101 with an explicit validity bit shown at 130. The validity bit 130 is configured so that if it takes on a first value, e.g., logic "1", the timestamp value in Timestamp subfield 120 is valid, and if the validity bit takes on a second value, e.g., logic "0", the timestamp value in the Timestamp subfield 120 is invalid. Invalid timestamp values are preserved across the network domain by other network devices that receive a packet with a TTAG indicated to contain an invalid timestamp value.

There is another way to signify an invalid timestamp value in a packet without using the explicit validity bit 130. A Timestamp subfield value of zero represents an invalid timestamp. Thus, when the value contained in Timestamp subfield 130 is all zeros, a network device construes this as indicating that the timestamp contained in the TTAG is invalid. The subfield can be compatible with timestamp always valid in the network when invalid capability is disabled in the network domain. Thus, a predetermined bit pattern (e.g., all zeros) in the Timestamp subfield 130 indicates that the timestamp information of the Timestamp subfield is not valid.

Figure 3C:
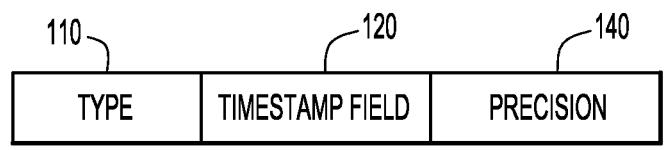

FIG. 3C illustrates another format of a TTAG shown at reference numeral 102. In this example, there is an additional precision subfield 140 that contains a bit pattern configured to indicate precision of the timestamp value contained in the Timestamp subfield 120. The concept of network-wide pre-negotiated precision was described above.

Figure 3D:
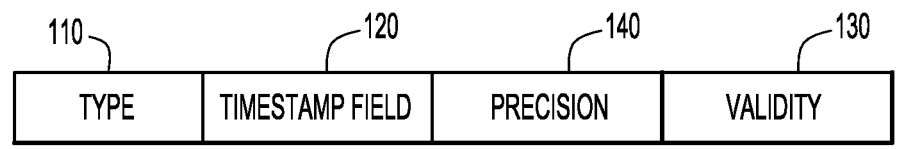

FIG. 3D illustrates still another format of a TTAG shown at reference numeral 103. This example shows that there is both the explicit validity bit 130 and precision subfield 140.

Figure 3E:
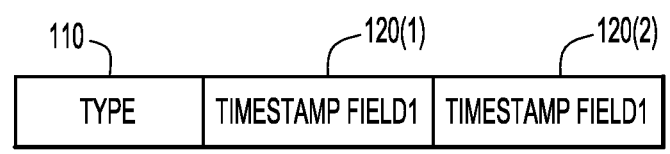

FIG. 3E illustrates yet another format of a TTAG shown at reference numeral 104. TTAG 104 includes multiple Timestamp fields 120(1), 120(2), etc. Each Timestamp subfield can contain a different timestamp value inserted by the same network device or by different network devices.

Figure 4:
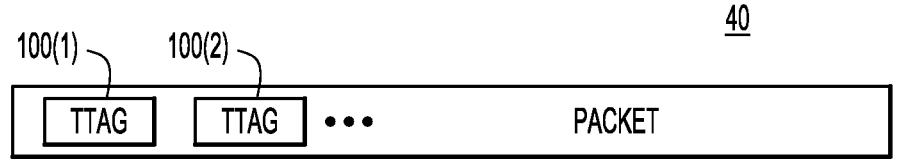
FIG. 4 illustrates an example of a packet having one or more TTAGs.

Turning to FIG. 4, a general diagram is shown of a packet 40 having one or more TTAGs 100(1), 100(2), etc., therein. In the simple case, a packet will have only one TTAG at any given time. However, there is utility in the capability of multiple TTAGs in a packet. For example, multiple TTAGs can be inserted in situations when packets are encapsulated in tunnels or if negotiated across ports of network devices. Furthermore, each packet that has a TTAG inserted into it does not affect the networking operations performed by any network device that receives the packet. Any network device can obtain information from the TTAGs contained in packets and thereby obtain visibility to latency within the network.

In some implementations of the techniques described herein, the number of TTAGs that can be inserted into a packet is limited in number to, for example, six (6) or some number between one (1) and ten (10). In other implementations, the number of TTAGs that can be inserted into a packet is unlimited, in which any device that receives the packet within the network for passing the packet to a destination from a source can insert a TTAG into the packet. In some implementations, when the maximum number of TTAGs that can be inserted into a packet is reached, downstream network devices cannot insert TTAGs into the packet. In yet other implementations, when the maximum number of TTAGs that can be inserted into a packet is reached, downstream network devices are allowed to overwrite TTAGs on a first-in, first-out basis.

There are numerous possibilities for locating the TTAG information in the packet. The TTAG can be inserted within a Layer 2 portion of the packet. This is in contrast to conventional approaches that perform application-specific packet time measurements at Layer 3. For example, one conventional packet time measurement approach collects runtime measurement of packets based on an application-specific determination of packet arrivals at Layer 3, as opposed to incorporating timestamp tag information directly into all packets at Layer 2 as accomplished using the techniques presented herein.

In some implementations, such as for Internet Protocol Version 4 (IPv4) or IPv6 packets, the TTAG can be provided immediately after the virtual local area network (VLAN) subfield and immediately before the IPv4 or IPv6 field in the packet header portion of the packet, in which the TTAG is meshed in the protocol stack within the header portion of the packet. Other locations for insertions of the TTAG within a packet may be envisioned while remaining within the spirit and scope of the techniques presented herein.

Figure 5:
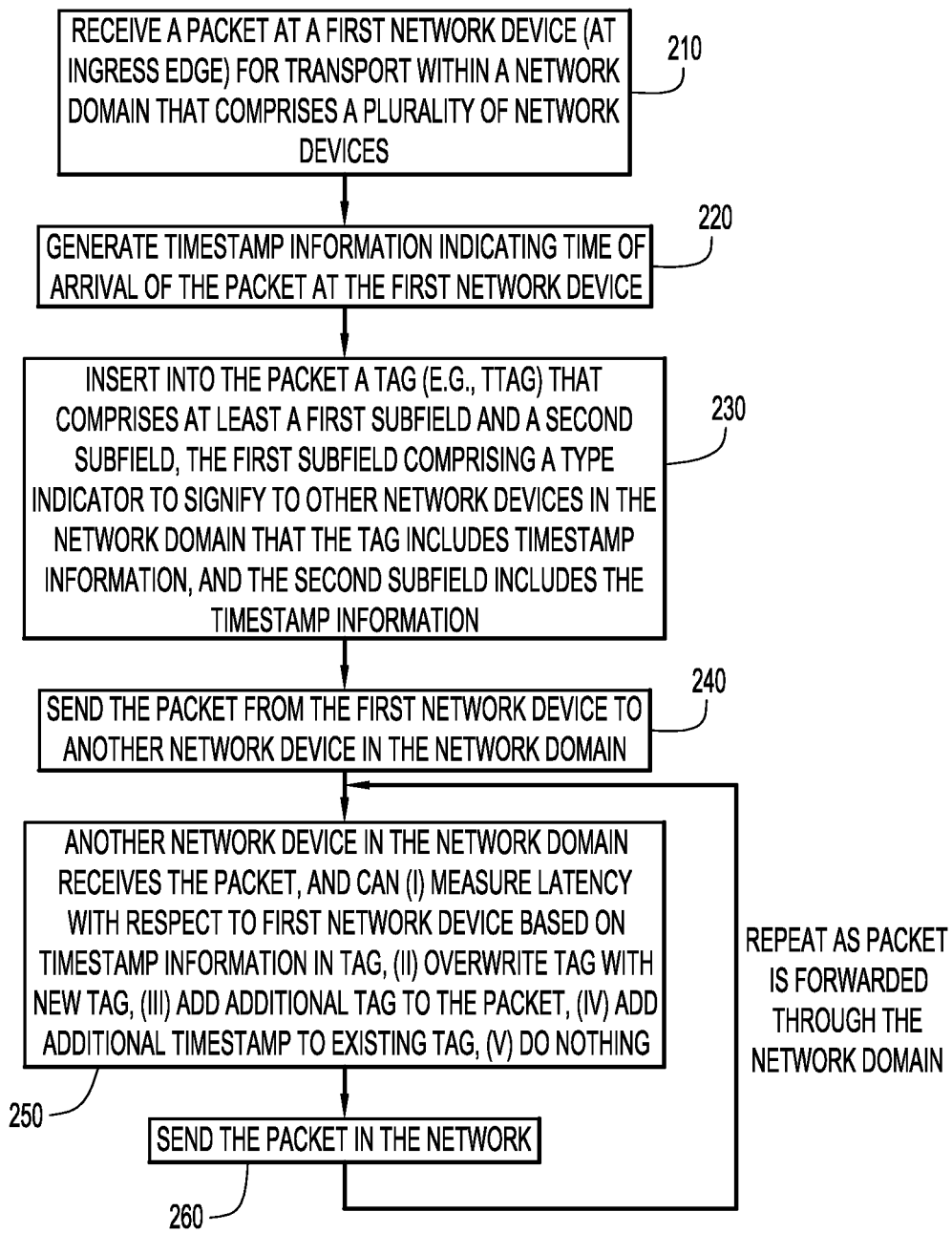
FIG. 5 is a flow chart that depicts operations performed by network devices that insert and operate on TTAGs.

Turning now to FIG. 5, a flow chart is presented that illustrates an operational flow 200 with respect to network devices that insert and interpret TTAGs in packets as the packets traverse through a network domain. At 210, a packet at a first network device (e.g., ingress edge node for the packet) of a network domain is received. The packet is for transport through the network domain, and the network domain includes a plurality of network devices, e.g., as depicted in FIG. 1. At 220, the first network device generates timestamp information indicating time of arrival of the packet at the first network device. As explained above in connection with FIG. 1, the timestamp is generated with respect to a time reference that is common across all of the network devices in the network domain. At 230, the first network device inserts into the packet a tag that comprises at least a first subfield and a second subfield. The first subfield comprising a type indicator to signify to other network devices in the network domain that the tag includes timestamp information, and the second subfield includes or contains the timestamp information.

At 240, the first network device sends the packet to another network device in the network domain, using the normal packet processing functions for the packet. At 250, another network device in the network domain receives the packet, and can perform any one or more of: (i) measuring latency with respect to first network device based on timestamp information in tag, (ii) overwriting tag with new tag, (iii) adding an additional tag to the packet, and (iv) adding an additional timestamp to an existing tag, or (v) doing nothing and processing the packet in the normal course without performing any of operations (i)-)(iv).

At 250, the network device sends the packet on in the network in the ordinary course of packet processing. Operations 240 and 250 are repeated at subsequent network devices in the network domain as the packet travels through the network domain.

As explained above in connection with FIGS. 1 and 2, a network management station may receive reports as to latency values measured by network devices in the network domain. The network management station may also configure the various network devices to perform more specialized tagging of packets, depending on certain applications supported in the network, tunnels supported in the network, etc. The latency measurements made by network devices at the edge of the network domain and at various points in between allow a network administrator to understand how the network domain is handling traffic and whether there are network congestion issues within a particular portion of the network domain.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The above description is intended by way of example only.

What is claimed is:

1. A method comprising:
receiving a packet at a first network device for transport within a network domain that comprises a plurality of network devices, wherein the plurality of network devices have a common time reference, and wherein the first network device is at an ingress edge of the network domain for the packet, wherein the packet is received at the network device from outside of the network domain;
generating, by the first network device, timestamp information indicating time of arrival of the packet within the network domain;
inserting into the packet a tag that comprises at least a first subfield and a second subfield, the first subfield comprising a type indicator to signify to other network devices in the network domain that the tag includes timestamp information data, and the second subfield includes the timestamp information, wherein the timestamp information is configured to be used by each device in the network domain that receives the packet as an indication of when the packet entered the network domain; and
sending the packet from the first network device to another network device in the network domain.

2. The method of claim 1, further comprising:
receiving at a second network device the packet sent from the first network device;
determining a time of arrival of the packet at the second network device; and
measuring latency of the packet within the network domain based on the time of arrival of the packet and the timestamp information contained in the tag of the packet.

3. The method of claim 1, further comprising:
at each of the other network devices in the network domain:
receiving the packet sent by the first network device;
determining time of arrival of the packet; and
measuring latency of the packet within the network domain based on the time of arrival of the packet and the timestamp information contained in the tag of the packet.

4. The method of claim 1, wherein the first subfield of the tag is an Ethertype subfield.

5. The method of claim 1, further comprising inserting in the tag a validity bit that indicates whether or not the timestamp information is valid.

6. The method of claim 1, wherein inserting into the packet comprises inserting a predetermined bit pattern in the second subfield to indicate that the timestamp information of the second subfield is not valid.

7. The method of claim 1, further comprising:
receiving at a second network device the packet sent from the first network device; and
inserting an additional tag into the packet, the additional tag including timestamp information representing time of arrival of the packet at the second network device.

8. A method comprising:
receiving a packet at an egress port of a first network device, the packet having been transported within a network domain that comprises a plurality of network devices, wherein the plurality of network devices have a common time reference, and wherein the first network device is at an egress edge of the network domain for the packet;
determining a time of arrival of the packet at the first network device;
extracting, by the first network device, timestamp information indicating time of arrival of the packet within the network domain, wherein the packet was received within the network domain at a second network device, wherein the second network device is arranged at an ingress edge of the network domain for the packet; and
determining the latency of the packet within the network domain by calculating an elapsed time between the timestamp information and the arrival of the packet at the egress port of the first network device.

9. The method of claim 8, wherein extracting the timestamp information comprises extracting at least a first subfield and a second subfield, the first subfield comprising a type indicator signifying that the second subfield includes the timestamp information.

10. The method of claim 9, wherein extracting the first subfield comprises extracting an Ethertype subfield.

11. The method of claim 9, wherein extracting the timestamp information comprises extracting a predetermined bit pattern in the second subfield to indicate that the timestamp information of the second subfield is not valid.

12. The method of claim 8, wherein extracting the timestamp information comprises extracting timestamp information for each of the plurality of network devices that the packet traversed travelling from the second network device to the first network device.

13. The method of claim 8, wherein extracting the timestamp information comprises extracting a validity bit that indicates whether or not the timestamp information is valid.

14. The method of claim 8, wherein extracting the timestamp information comprises extracting the timestamp information from an Open Systems Interconnection model Layer 2 portion of the packet.

15. An apparatus comprising:
a plurality of ports each configured to receive and send packets in a network domain, wherein at least one of the plurality of ports is an egress port at an egress edge of the network domain;
a timestamp logic unit configured to extract timestamp information indicating time of arrival of the packet at the network domain, wherein the timestamp information is generated at a network device arranged at an ingress edge of the network domain for the packet; and
a latency measurement unit configured to determine a time of arrival of the packet at the egress port and determine an elapsed time between the arrival of the packet at the network domain and the arrival of the packet at the egress port.

16. The apparatus of claim 15, wherein the timestamp logic unit is configured to extract at least a first subfield and a second subfield, the first subfield comprising a type indicator signifying that the second subfield includes the timestamp information.

17. The apparatus of claim 16, wherein the timestamp logic unit is configured to extract the first subfield as an Ethertype subfield.

18. The apparatus of claim 16, wherein the timestamp logic unit is configured to extract the timestamp information by extracting a predetermined bit pattern in the second subfield to indicate that the timestamp information of the second subfield is not valid.

19. The apparatus of claim 15, wherein the latency measurement unit is configured to determine the elapsed time from the time of arrival of the packet at the egress port and the timestamp information.

20. The apparatus of claim 15, wherein the timestamp logic unit is configured to timestamp information from an Open Systems Interconnection model Layer 2 portion of the packet.

21. The apparatus of claim 15, wherein the timestamp logic unit is configured to extract the timestamp information by extracting a validity bit that indicates whether or not the timestamp information is valid.

22. The apparatus of claim 15, wherein the timestamp logic unit is configured to extract the timestamp information by extracting the timestamp information from an Open Systems Interconnection model Layer 2 portion of the packet.

23. The method of claim 1, wherein generating the timestamp information indicating time of arrival of the packet within the network domain comprises determining a time of arrival at the first network device.

24. The method of claim 1, wherein inserting into the packet the tag comprises inserting the tag in an Open Systems Interconnection model Layer 2 portion of the packet.

\* \* \* \* \*